3,019,114
GAS EVOLVING PROTECTIVE COATING
Raymond Jack Grantham, Wexford, Pa., assignor to Callery Chemical Company, Pittsburgh, Pa., a corporation of Pennsylvania
No Drawing. Filed Nov. 24, 1959, Ser. No. 855,004
8 Claims. (Cl. 106—13)

This invention relates to a new and improved protective coating composition and more particularly to a gas evolving coating containing an amine borane or a metal borohydride.

This invention is based on our discovery that a minor amount of an amine borane or metal borohydride may be admixed with a paint, varnish, enamel, lacquer or the like; and that this composition, used in the conventional manner, forms a protective coating that slowly evolves gas for an extended period of time. The new protective coatings are especially desirable for use on catwalks, ladders, ship decks and superstructures and the like where the formation of ice coatings in inclement weather creates hazardous conditions and dangerous footing. The slow gas evolution from the new protective coatings prevent the formation of such dangerous adherent ice coatings by continually breaking off ice due to the gas pressure developed at the ice protective coating interface. In addition the gas evolution coatings more effectively protect the coated surface from oxidative deterioration, and prolong the life of the coating by reducing moisture penetration and decreasing the deterioration caused by oxidation. This is accomplished by both the reducing action of the amine borane or metal borohydride in the coating composition and by the gas evolution.

According to this invention the amine borane or metal borohydride is dissolved or dispersed in a protective coating composition that form an adherent film on the material to be protected, and most suitably to a composition containing a natural or synthetic drying oil base. Suitable protective coatings include those commonly referred to as paints, enamels, lacquers, and varnishes. The protective base of these coatings may be a natural or modified ester, polyester, or resin such as linseed oil, boiled linseed oil, china wood oil, tung oil, rosin, cellulose nitrate, cellulose acetate, cellulose propionate, cellulose butyrate, and the like; or synthetic polyesters or resins such as may be obtained from reacting polyhydric alcohols such as ethylene glycol, pentaerythritol, glycerol, propylene glycol, or 4-4'-bis(hydroxyphenyl)dimethyl methane with dibasic carboxylic acids, esters or anhydrides, such as phthalic anhydride, isophthalic acid, dimethyl isophthalate, terephthalic acid, dimethyl terephthalate, adipic acid, azelaic acid, succinic acid, succinic anhydride, maleic acid, fumaric acid, and the like, either alone or in conjunction with vinyl type monomers such as styrene; or natrural or synthetic polymers; and homopolymers or copolymers of isoprene, butadiene, chloroprene, coumarone, indene, styrene, acrylonitrile, acrylic acid, methyl acrylate, methyl methacrylate and the like; or resins formed from phenol, urea, melamine and formaldehyde. The coating compositions may contain the usual suitable inert solvents, pigments, extenders and driers if desired. The uses and types of these and other similar protective coatings are well known in the art, and the new compositions containing amine boran or metal borohydride are used in the same manner.

Generally all amine boranes are suitable for use in the new composition. Illustrative of the suitable amine boranes are alkylamine boranes, such as mono-, di-, and tri-, methyl, ethyl, n-propyl, isopropyl, n-butyl, n-amyl, and octyl amine boranes; polyfunctional aliphatic amine boranes such as ethylene diamine bis(borane), diethylene triamine tris(borane), triethylene tetramine tetrakis(borane), and dimethylamino propylamine bis(borane); cyclic aliphatic amine boranes such as piperidine borane; cyclic amine boranes such as pyridine borane, lutidine borane, picoline borane, quinoline borane and indole borane; heterocyclic amine boranes such as morpholine borane; aromatic amine boranes such as aniline borane, toluidine boranes, metaphenylenediamine bis(borane), di and triphenylamine boranes, methylene dianiline bis-(borane); and mixed aliphatic-aromatic amine boranes such as dimethylbenbylamine borane, $\alpha$-methylbenzyldimethylamine borane, N-methyl phenylene diamine bis-(borane), methyl phenyl amine borane, and ethyl phenyl amine boranes.

The alkali metal borohydrides and alkaline earth metal borohydrides are suitable for use in the new compositions, e.g., lithium borohydride, sodium borohydride, potassium borohydride, calcium borohydride, and magnesium borohydrides. The pyrophoric borohydrides, such as aluminum borohydrides, are not suitable.

The new compositions of this invention are formed simply by mixing together the amine borane or metal borohydride and a paint, varnish, enamel, or lacquer or similar coating material. The resultant composition is then applied to the surface to be protected by any of the usual methods, such as brushing, rolling, spraying, or dipping. The protective coating is then formed by air drying or curing at ambient or elevated temperatures. Since the new compositions may begin to evolve gas on mixing, they are preferably mixed just prior to use. If stored, they should be stored only in containers suitably constructed to permit the release of generated gas.

The amine boranes are sufficiently soluble that they may be readily and simply stirred into the paint or varnish or the like the same as an inert solvent or extender. The borohydrides are substantially insoluble, and are added and mixed in the same manner as pigments. For example, they may be added as a finely divided dry powder; or a storable paste of the finely divided borohydride in an inert fluid such as a mineral oil, benzene, ethers or the like may be premixed by usual methods such as ball milling and can be incorporated in the coating composition at the time of use.

The amine borane or metal borohydride does not adversely affect the adherence or quality of the protective coating, as compared to the coating obtained from the base composition alone. However, no protective coating can be applied over a gas evolving coating which is still active since the gas evolution causes blistering and bubbling and poor adhesion of the over coating. Therefore, these new coatings are used as single coatings, or as the final coating in multi coating applications.

The new compositions preferably contain from about 0.01% to 10% of the amine borane or metal borohydride, depending on the amount and duration of gas evolution desired. Substantially one mole of gas evolved for each equivalent of B-H bonds in the amine borane or metal borohydrided. For example, 1 mole of trimethylamine borane evolves about 3 moles of gas and 1 mole of sodium borohydride evolves 4 moles of gas. The gas evolution continues slowly over an extended period of time, up to several months. Generally, the borohydrides evolve gas more rapidly and have a shorter active life than the amine boranes, and compositions containing both borohydrides and amine boranes may be used to obtain modified gas evolution characteristics.

The following examples are illustrative of this invention. One gram of dimethylamine borane dissolved in 5 cc. of benzene to facilitate mixing, was stirred into 100 g. of a typical alkyd deck paint containing 47% pigment (silicates and titanium dioxide), 53% vehicle. The varnish vehicle was made up of 52% non-volatile linseed-maleic alkyd resin and 48% volatile mineral spirits. On mixing there was a moderate amount of visible foaming or gas evolution which subsided quickly. The mixture was placed in a tube attached to a graduated container filled with mineral oil in such a manner that the gas evolved would be measured by volumetric displacement of the mineral oil. Gas was continuously and slowly evolved from the mixture; after 195 days a total of 572 cc. of gas had been evolved, and gas evolution had not yet ceased. Similarly, a dispersion of 1 g. of finely divided potassium borohydride in 5 cc. of benzene was mixed into 100 g. of the alkyd paint. After the initial gas evolution or mixing, the mixture was placed in a tube and the gas evolution measured as in the previous example and after 53 days a total of 225 cc. of gas had been collected. Other compositions of borohydrides and amine boranes with the alkyd paint were similarly active after extended periods of time. For example, the amount of gas evolved from compositions containing 1 g. of the borohydride or amine borane in 100 g. of the above mentioned alkyd paints was as follows: sodium borohydride, 160 cc. in 40 days, trimethylamine borane, 83 cc. in 195 days and pyridine borane, 392 cc. in 195 days.

In another example, 1 g. of finely divided potassium borohydride was stirred into 100 g. of the alkyd paint. The composition was painted onto clean glass plates and allowed to dry for three days at atmospheric conditions. The paint film dried in the usual manner, was adherent, and was free of pinholes or blowholes when viewed at 50 magnifications. A portion of the dried paint film, which weighed 48.5 g., was mechanically removed and placed in glass tubes adapted to measure the gas evolution. After 120 days 286 cc. of gas had been evolved, and the dried paint film was still actively evolving gas. Dried protective coating films with other paint, varnish, enamel, or lacquer compositions containing amine boranes and borohydrides similarly evolve gas for an extended period of time.

According to the provisions of the patent statutes, I have explained the principle and mode of practicing my invention, have described what I now consider to be its best embodiments. However, I desire to have it understood that within the scope of the appended claims, the invention may be practiced otherwise than as specifically described.

I claim:

1. A protective gas-evolving film-forming composition consisting essentially of a protective film forming composition containing between about 0.1% to 10% of a compound selected from the group consisting of amine boranes, alkali metal borohydrides, and alkaline earth metal borohydrides, and mixtures thereof.

2. A composition according to claim 1 in which the said member is potassium borohydride.

3. A composition according to claim 1 in which the said member is sodium borohydride.

4. A composition according to claim 1 in which the said member is a lower alkylamine borane.

5. A composition according to claim 4 in which the alkylamine borane is a methylamine borane.

6. A composition according to claim 1 in which the amine borane is pyridine borane.

7. A protective gas-evolving film-forming composition consisting essentially of a drying oil base film forming composition containing between about 0.1% to 10% of a member selected from the group consisting of amine boranes, alkali metal borohydrides and alkaline earth metal borohydrides and mixtures thereof.

8. A gas evolving protective film consisting essentially of a drying oil base film containing a minor proportion of a member selected from the group consisting of amine boranes, alkali metal borohydrides, and alkaline earth metal borohydrides, and mixtures thereof.

References Cited in the file of this patent

Hurd: Chemistry of the Hydrides, John Wiley & Sons, 1952, pages 162–163.